United States Patent [19]

Ackley

[11] 4,394,933

[45] Jul. 26, 1983

[54] CAPSULE ORIENTING APPARATUS

[76] Inventor: E. Michael Ackley, 1273 N. Church St., Moorestown, N.J. 08057

[21] Appl. No.: 258,745

[22] Filed: Apr. 29, 1981

[51] Int. Cl.³ ............................................ B65G 47/24
[52] U.S. Cl. .................................... 221/173; 221/211
[58] Field of Search ............... 221/211, 157, 159, 173, 221/167; 198/380, 287, 271; 101/40; 53/266 R

[56] References Cited

U.S. PATENT DOCUMENTS 3,933,239  1/1976  Yoshida .......................... 222/173 X
4,029,235  6/1977  Grataloup ........................... 221/211

Primary Examiner—Stanley H. Tollberg
Attorney, Agent, or Firm—Weiser, Stapler & Spivak

[57] ABSTRACT

Capsule orienting apparatus in which misoriented asymmetric capsules inadvertently passed by a rectifying unit are segregated from properly oriented capsules. Capsules (12) are delivered by a rectifying drum (14) to capsule carrying pockets (38) in a segregating drum (36) which have recessed portions (38a) sized to loosely receive properly oriented capsules and tightly receive misoriented capsules. As the loosely held, properly oriented capsules pass a discharge point, they are released. The tightly held, misoriented capsules remain in the segregating drum (36) past the discharge point and are ejected from the segregating drum downstream from the discharge point.

23 Claims, 7 Drawing Figures

CAPSULE ORIENTING APPARATUS

DESCRIPTION

1. Technical Field

The present invention relates, in general, to materials handling and, in particular, to apparatus for orienting capsules having telescoping cap and body portions.

2. Background Art

Medicinal compounds commonly are supplied in ingestible two-part capsules having telescoping cap and body portions. It is the usual practice, in the preparation of such capsules, to imprint indicia on the surfaces of the capsules to indicate, for example, the name of the manufacturer or the batch from which the medicinal compound has been derived or to provide other information which may be required by the Food and Drug Administration or by other governmental agencies. Spin printing techniques often are used to imprint such capsules.

The preferred practice is to orient the capsules prior to imprinting, so that the indicia is applied at the same location on each capsule. This facilitates inspection of the capsules. Also, certain marking techniques require the capsules to be supplied in uniform orientation.

Many capsules orienting methods and apparatus have been suggested in the past and a variety have been adopted for use by the pharmaceutical industry. Despite the fact that much effort and expense has been made in the development of capsule orienting units, those in use today generally do not satisfy the concurrent requirements of reliability, operational simplicity and reasonable cost. A major problem is that a small percentage of the capsules leave the orienting unit misoriented. Although the number of misoriented capsules may be small, the quality control requirements, as well as other considerations, make even this number of misoriented capsules unacceptable to drug manufacture. This has required the addition of a visual inspection step after capsule orientation or capsule marking to segregate misoriented capsules and reduce the number of misoriented capsules which might otherwise pass through. Human inspection is costly, time consuming and still may result in an unacceptably high rate of misoriented or misprinted capsules not being separated out from those which are oriented and marked correctly.

DISCLOSURE OF THE INVENTION

Accordingly, it is an objective of the present invention to provide new and improved apparatus for orienting capsules.

It is another objective of the present invention to provide capsule orienting apparatus which reduces considerably the number of capsules which might remain misoriented.

It is a further objective of the present invention to provide capsule orienting which is efficient in design and operation.

These and other objectives are achieved by apparatus constructed in accordance with the present invention. Such apparatus includes means for supplying, in random orientation, capsules having telescoping cap and body portions and rectifying means for receiving the capsules in random orientation and for delivering the capsules in uniform orientation. The apparatus of the invention further includes selection means for receiving the capsules from the rectifying means and for segregating any of the capsules which are not in uniform orientation. The selection means include a transfer mechanism having a set of pockets for receiving the capsules from the rectifying means and for moving the capsules to a discharge point. Each of the pockets in the transfer mechanism has a recessed portion disposed perpendicular to the direction of movement of the transfer mechanism and is sized larger than the body portions of the capsules and smaller than the cap portions of the capsules. The selection means further include means for driving the capsules from the rectifying means into the pockets in the transfer mechanism, whereby capsules having their body portions in the recessed portions of the pockets are loosely held and capsules having their cap portions in the recessed portions of the pockets are tightly held. The selection means also include means for discharging the loosely held capsules from the pockets at the discharge point and means for ejecting the tightly held capsules from the pockets at an ejection point.

BRIEF DESCRIPTION OF THE DRAWINGS

Referring to the drawings.

BEST MODE OF CARRYING OUT THE INVENTION

Figure 1:
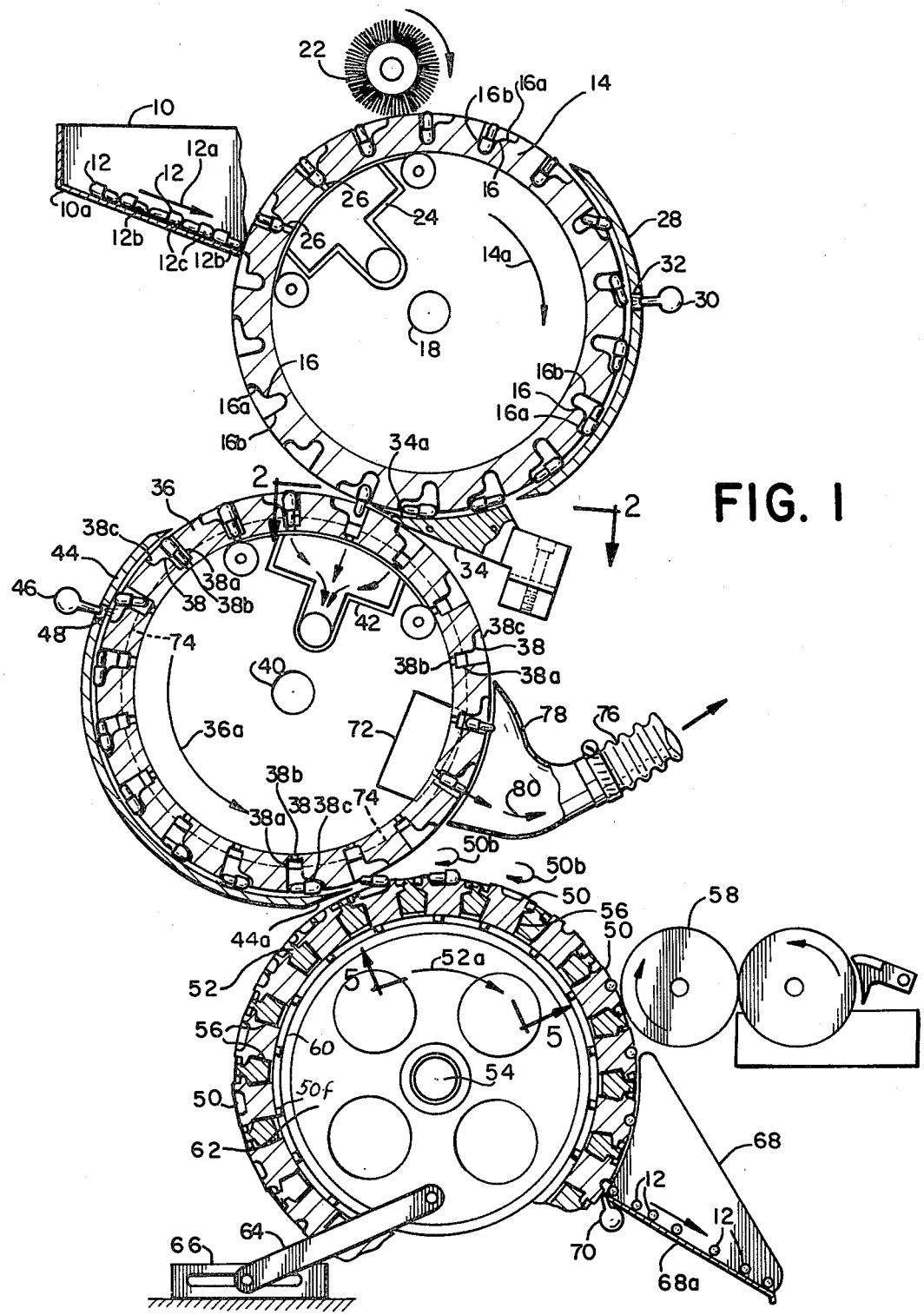
FIG. 1 is a sectional side view of apparatus constructed in accordance with the present invention.

Referring to FIG. 1, apparatus for orienting capsules, constructed in accordance with the present invention, includes means of supplying, in random orientation, capsules having telescoping cap and body portions. Such means may include a hopper 10, of conventional construction and operation, from which a plurality of capsules 12 are supplied serially in the direction of an arrow 12a. Hopper 10 may be mounted upon a suitable support (not shown) and may include an inclined bottom surface 10a along which the capsules move to an opening at the bottom of the hopper from which the capsules emerge in random orientation. As shown, some of the capsules are oriented with their body portions 12b disposed forward, while others are oriented with their cap portions 12c disposed forward.

The FIG. 1 apparatus further includes rectifying means for receiving capsules 12 in random orientation and for delivering the capsules to a delivery point in uniform orientation. The rectifying means may include a transfer mechanism, in the form of a rotating drum 14, having a set of pockets 16 which receive the capsules from hopper 10 and move the capsules to the delivery point. Drum 14 is mounted for rotation about a rotation axis, defined by the axis of a shaft 18, and is arranged to rotate in the direction of an arrow 14a.

Each of the pockets 16 has a peripheral portion 16a formed on the surface of drum 14 and disposed in the direction of rotation of drum 14. In addition, for the embodiment of the invention illustrated in FIG. 1, each of the pockets 16 has a radial portion 16b. Capsules 12 are received in random orientation in the radially disposed portions 16b of pockets 16. The angle of inclination of hopper surface 10a is arranged to be in radial alignment with radial portion 16b of pockets 16. It should be noted, however, that hopper 10 and rotary drum 14 may be so arranged that capsules 12 may be fed in such a manner as to lay directly in peripheral portions 16a of pockets 16. A rotating brush 22 may be provided to assist in aligning and positioning capsules 12 in pockets 16.

A vacuum chest 24, of conventional construction and operation and located within rotating drum 14, may be provided to aid in seating capsules 12 within pockets 16. In such a case, through holes 26, extending from the bottoms of radial portions 16b of pockets 16 to the inside surface of drum 14, would be required to provide communication between pockets 16 and vacuum chest 24. The vacuum chest may be connected to a vacuum source by conventional means.

As drum 14 rotates and capsules 12 approach or pass through the horizontal of drum 14, the capsules move from radial portions 16b of pockets 16 to peripheral portions 16a. A back guide 28, positioned adjacent drum 14, limits the radially outward movement of capsules 12 and guides the capsules into peripheral portions 16a of pockets 16. In order to assure that capsules 12 will move into peripheral portions 16a of pockets 16, air under pressure may be applied from an air jet 30. Air jet 30 projects through an opening 32 in back guide 28 and supplies a jet stream of air which impinges upon the surfaces of pockets 16 to move capsules 12 radially outward into peripheral portions 16a of pockets 16. As a result, capsules 12 continue to move with drum 14 but now the capsules ride within peripheral portions 16a of pockets 16 as the pockets move below the horizontal of the drum.

The rectifying means further include a guide 34 positioned adjacent rotating drum 14. Guide 34 may be considered an extension of back guide 28. As shown most clearly in FIGS. 2 and 3, a nose portion 34a of guide 34 has a slot 34b which is aligned with pockets 16 and is sized to permit body portions 12b of capsules 12 to hang through the slot and prevent cap portions 12c of the capsules from passing through the slot. Each capsule 12 having its body portion 12b leading rotates about a horizontal axis from a peripheral position in peripheral portion 16a of pocket 16 to a radial position shortly after some portion of the capsule clears the innermost surface 34c of slot 34b. This is shown by capsule 12' in the lower track in FIG. 2. Each capsule 12 having its cap portion 12c leading rotates about a horizontal axis from a peripheral position in peripheral portion 16a of pocket 16 to a radial position after the entire capsule has cleared the innermost surface 34c of slot 34b. This is shown by capsule 12' in the upper track in FIG. 2. As a result, the capsule delivered by drum 14 to slotted nose portion 34a of guide 34 are positioned with the edges of their cap portions 12c resting on the edges of slot 34b and their body portions 12b hanging through the slot. This is shown by capsule 12" in the lower track in FIG. 2.

Although the rectifying means are arranged to receive randomly oriented capsules and deliver uniformly oriented capsules, as indicated previously, some small percentage of capsules, still may be delivered misoriented. In order to eliminate or greatly reduce the small number of misoriented capsules delivered by the rectifying means, the present invention further includes selection means for receiving capsules from the rectifying means and for segregating any of the capsules which are not delivered by the rectifying means in uniform orientation. The selection means include a transfer mechanism, in the form of a rotating drum 36, having a set of pockets 38 for receiving capsules 12 from the rectifying means and for moving the capsules to a discharge point. Drum 36 is mounted for rotation about a rotation axis, defined by the axis of a shaft 40, and is arranged for rotation in the direction of an arrow 36a.

Each of the pockets 38 has a recessed portion 38a disposed perpendicular to the direction of movement of drum 36. In particular, recessed portions 38a of pockets 38 are disposed radially of drum 36. Each recessed portion 38a of pocket 38 is sized larger than body portions 12b of capsules 12 and smaller than cap portions 12c of capsules 12. This is shown most clearly in FIG. 3.

Shafts 18 and 40 of drums 14 and 36, respectively, are arranged parallel to one another so that the rotation axes of drums 14 and 36 are parallel and located on opposite sides of the path of movement of peripheral portions 16a of pockets 16. The movements of drums 14 and 36 are synchronized so that pockets 16 in drum 14 and pockets 38 in drum 36 arrive at the delivery point at the end of nose portion 34a of guide 34 at the same time.

The selection means also include means for driving capsules 12 from the rectifying means into pockets 38 in drum 36. As each capsule 12 clears the end of nose portion 34a of guide 34, it is free to move from a pocket 16 in drum 14 to a pocket 38 in drum 36. This is illustrated most clearly in FIGS. 2 and 3 which shows two capsules 12'" which have cleared the end of guide 34. A vacuum chest 42, of conventional construction and operation and located within drum 36, may be used to draw capsules 12 from pockets 16 into pockets 38 after the capsules clear nose portion 34a of guide 34. In particular, vacuum chest 42 is in fluid communication with recessed portions 38a of pockets 38 via through holes 38b. As the capsules move into slot 34b of guide 34, they feel the effect of vacuum chest 42 and shift from lying in the peripheral portions 16a of pockets 16 to the radial position as previously described. Continued movement of the capsules past the end of nose portion 34a of guide 34 permits the transfer of the capsules from drum 14 to drum 36.

Figure 3:
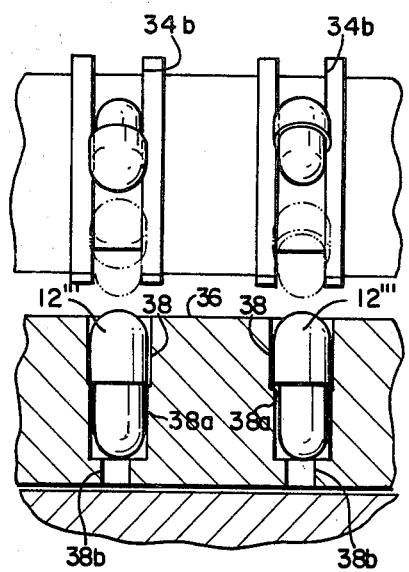
FIG. 3 is a sectional view taken along line 3—3 of FIG. 2.

Each capsule 12 disposed in the desired orientation, namely with its body portion 12b hanging downwardly through slot 34b of guide 34, will be received in a recessed portion 38a of a pocket 38 with its body portion radially inward of drum 36. As a result, these capsules will be held loosely, as illustrated in FIG. 3, in recessed portions 38a of pockets 38 because the recessed portions of these pockets are sized larger than the body portions of the capsules.

Each capsule 12 which is misoriented, namely with its cap portion 12c disposed downwardly, will be received in a recessed portion 38a of a pocket 38 with its cap portion radially inward of drum 36. As a result, these capsules will be jammed into a recessed portion 38a of a pocket 38 and held tightly because the recessed portions of the pockets are sized smaller than the cap portions of the capsules.

As drum 36 rotates and capsules 12 approach or pass through the horizontal of drum 36, the capsules which are loosely held in recessed portions 38a of pockets 38 move from a radial position in the recessed portions of the pockets to a peripheral position in peripheral portions 38c of these pockets. A back guide 44, positioned adjacent drum 36 limits the radially outward movement of these capsules 12 and guides these capsules into the peripheral portions 38c of pockets 38. In order to assure that the loosely held capsules will move into the peripheral portions 38c of pockets 38, air under pressure may be applied from an air jet 46. Air jet 46 projects through an opening 48 in back guide 44 and supplies a jet stream of air which impinges upon the surface of pockets 38 to move the loosely held capsules radially outward into peripheral portions 38c of pockets 38. After being shifted from recessed portions 38a of pockets 38 to peripheral portions 38c, capsules 12 continue to be loosely held and move with drum 36 to a discharge point. Those capsules 12 which are tightly held in recessed portions 38a of pockets 38 remain in the recessed portions of the pockets even after they pass below the horizontal of the drum because neither the pressure of the air stream from air jet 46 nor the weight of each capsule is sufficient to overcome the effect of the capsule having been jammed into the recessed portion of the pocket.

Figure 4:
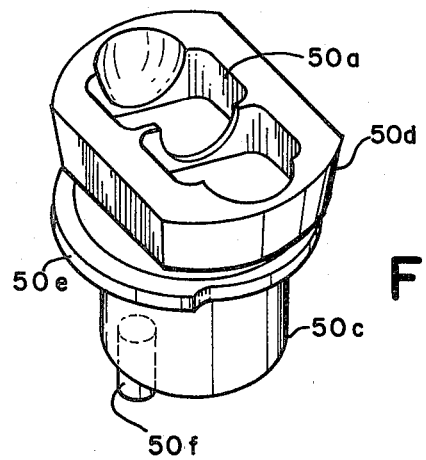
FIG. 4 is a perspective view of a component of the FIG. 1 apparatus.

As capsules 12 pass end 44a of back guide 44, the loosely held capsules are discharged from pockets 38 into a plurality of carriers 50 which are mounted at the periphery of a rotating drum 52. As shown most clearly in FIG. 4, each carrier has a pocket 50a sized to receive a capsule 12 loosely to permit the capsule to rotate about its longitudinal axis during a spin printing operation. Drum 52 is mounted for rotation about a rotation axis, defined by the axis of a shaft 54, and is arranged for rotation in the direction of an arrow 52a. Shaft 54 is arranged parallel to shafts 18 and 40 so that the rotation axes of drums 14, 36 and 52 are parallel. The movements of drums 36 and 52 are synchronized so that pockets 38 in drum 36 and pockets 50a in carriers 50 arrive at end 44a of back guide 44 at the same time. Carriers 50 are journalled for rotation, as indicated by a pair of arrows 50b in FIG. 1, within a plurality of bearings 56.

Each carrier 50 has a lower base portion 50c and an upper pocket portion 50d which contains pocket 50a. Lower base portion 50c is shown as having a smaller diameter than upper pocket portion 50d and the portions are separated by a locking ring which holds carriers 50 in position on drum 52.

Carriers 50 and drum 52 serve to deliver capsules 12 to a spin printing unit 58 with the capsules oriented properly. Spin printing unit 58 may be of conventional construction and operation. As drum 52 rotates in the direction of arrow 52a, carriers 50 move from the discharge point of drum 36 to spin printing unit 58. At the same time, each carrier rotates in the direction of arrows 50b, thereby shifting capsules 12 from a position extending in the direction of rotation of drum 52 to a position extending transverse to the direction of rotation of drum 52. This result may be achieved in a number of ways. For the embodiment of the invention being described, each carrier 50 is provided with a follower pin 50f extending downward from lower base portion 50c and offset from the axis of the carrier. Follower pin 50f functions as an eccentric which, in combination with a cam arrgangement 60 causes the carrier to rotate. Cam arrangement 60 is secured to a stationary barrel 62 which is positioned within drum 52 and concentric with drum 52. The position of barrel 62 may be adjusted by a torque arm 64 slidably mounted on an adjustment bracket 66. Sliding torque arm 64 along bracket 66 causes barrel 62 to rotate, thereby advancing or retarding the timing function represented by camming arrangement 60 and, thus, rotation of carriers 50.

Figure 6:
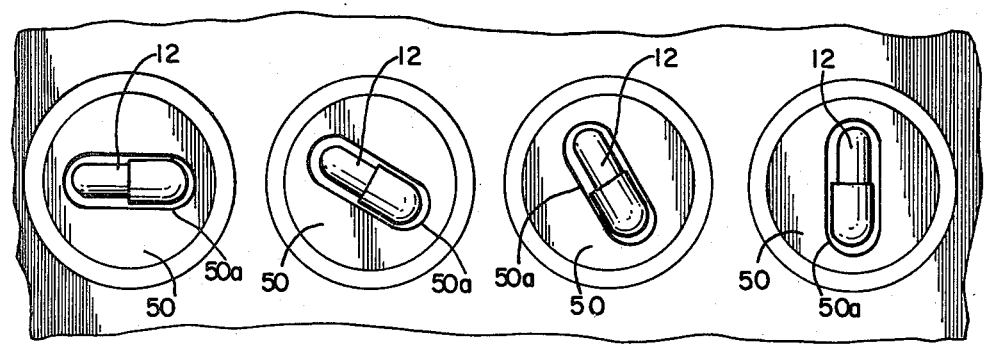
FIG. 6 is an enlarged, plan view of a portion of the FIG. 1 apparatus.
Figure 5:
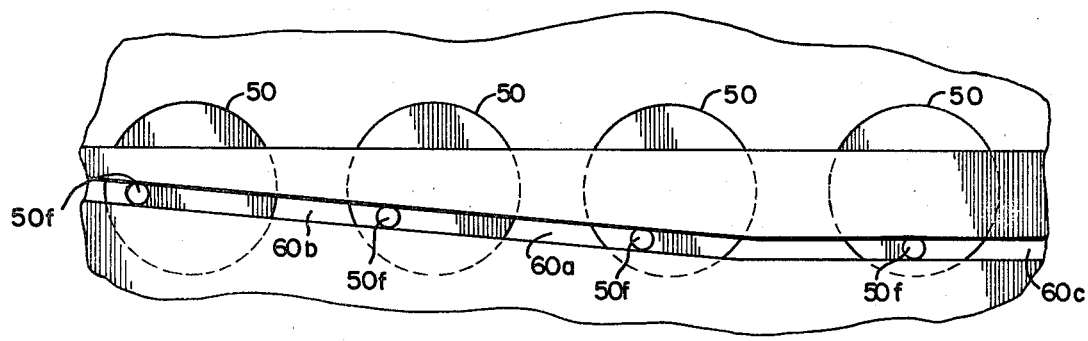
FIG. 5 is an enlarged, sectional view taken along line 5—5 of FIG. 1.

Camming arrangement 60 may take the form of a peripheral slotted ring which extends around barrel 62. Pin followers 50f of carriers 50 engage the slot in camming ring 60 so that the carriers are positioned with pockets 50a extending in the direction of rotation of drum 52 at the point where capsules 12 are received in pockets 50a. FIG. 5 shows the progressive movement of follower pins 50f as they advance through a slot 60a in camming ring 60 and FIG. 6 shows the corresponding progressive rotation of carriers 50 carrying capsules 12. Carriers 50 rotate 90° as follower pins 50f advance along a ramp portion 60b of camming ring 60 to a straightaway portion 60c of the camming ring. At some point after spin printing and discharge of capsules 12 from carriers 50, follower pins 50f follows a reverse ramp (not shown) in camming ring 60 to return the carriers to their original position to receive another capsule.

After the printing operation by spin printing unit 58, the printed capsules 12 are discharged from carriers 50 onto a delivery tray 68. The capsules roll down a sloping bottom surface 68a of delivery tray 68 for further processing. An air jet 70 may be provided at delivery tray 68 to assure discharge of the capsules from carriers 50.

Figure 7:
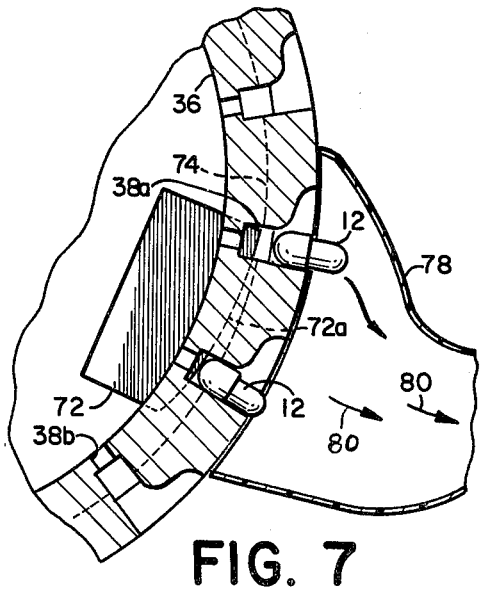
FIG. 7 is an enlarged, sectional view of a portion of the FIG. 1 apparatus.

Those capsules 12 which are tightly held in recessed portions 38a of pockets 38 in drum 36 are not discharged from pockets 38 into pockets 50a in carriers 50. These capsules pass the discharge point and are ejected at a position downstream from the discharge point. As best seen in FIG. 7, the ejection means may include a knock-out member 72 positioned within drum 36 between the discharge point of drum 36 and the point at which capsules are transferred from drum 14 to drum 36. Knock-out member 72 extends into a groove 74 which runs along the inside surface of drum 36 through recessed portions 38a of pockets 38 and through holes 38b. Face 72a of knock-out member 72 is shaped to push capsules 12 radially outward to loosen the capsules from recessed portions 38a of pockets 38. After capsules 12 have been loosened sufficiently from recessed portion 38a of pockets 38, removal of the capsules is aided by a vacuum applied through a hose 76 and housing 78. This vacuum serves to draw away the capsules as indicated by arrows 80 in FIGS. 1 and 7. It should be noted that groove 74 may be dimensioned to eliminate the need for separate through holes 38b. Instead, the vacuum from vacuum chest 42 may be applied through groove 74 to draw capsules 12 into recessed portions 38a of pockets 38.

Figure 2:
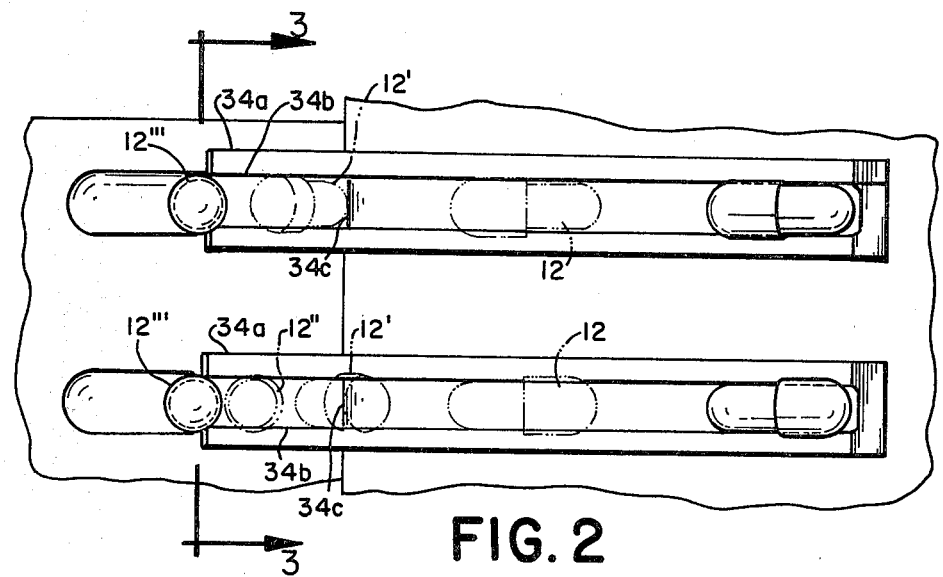
FIG. 2 is an enlarged, sectional view taken along line 2—2 of FIG. 1.

As shown by FIGS. 2 and 3, drums 14 and 36 may be arranged with a plurality of sets of pockets 16 and 38, respectively. In such a case, a corresponding number of sets of carriers 50 would be provided on drum 52.

While in the foregoing there has been described a preferred embodiment of the invention, it should be understood to those skilled in the art that various modifications and changes can be made without departing from the true spirit and scope of the invention as recited in the claims.

I claim:

1. Apparatus for orienting capsules having telescoping cap and body portions, said apparatus comprising:
   means for supplying, in random orientation, capsules having telescoping cap and body portions;

rectifying means for receiving said capsules in random orientaton and for delivering said capsules in uniform orientation;

and selection means for receiving said capsules from said rectifying means and for segregating any of said capsules which are not in uniform orientation, said selection means including:
(1) a transfer mechanism having a set of pockets for receiving said capsules from said rectifying means and for moving said capsules to a discharge point, each of said pockets having a recessed portion disposed perpendicular to the direction of movement of said transfer mechanism and sized larger than said body portions of said capsules and smaller than said cap portions of said capsules;
(2) means for driving said capsules from said rectifying means into said pockets in said transfer mechanism, whereby capsules having their body portions in said recessed portions of said pockets are loosely held and capsules having their cap portions in said recessed portions of said pockets are tightly held;
(3) means for discharging said loosely held capsules from said pockets in said transfer mechanism at said discharge point; and
(4) means for ejecting said tightly held capsules from said pockets in said transfer mechanism at an ejection point.

2. Apparatus according to claim 1 wherein said ejection means and ejection point are positioned downstream from said discharge point.

3. Apparatus according to claim 2 wherein said transfer mechanism includes a rotating drum and said recessed portions of said pockets are disposed radially.

4. Apparatus according to claim 3 wherein said driving means include a vacuum chest which draws said capsules from said rectifying means into said recessed portions of said pockets.

5. Apparatus according to claim 4 wherein said ejection means include a knock-out member positioned in the path of movement of said recessed portions of said pockets.

6. Apparatus according to claim 1 wherein each pocket also has a peripheral portion disposed in the direction of movement of said transfer mechanism.

7. Apparatus according to claim 3 wherein each pocket also has a peripheral portion disposed in the direction of rotation of said rotating drum and said selection means also include a curved back guide extending adjacent said peripheral portions of said pockets from a point above the axis of rotation of said rotating drum to said discharge point.

8. Apparatus according to claim 1 wherein said rectifying means include:
(1) a transfer mechanism having a set of pockets for receiving said capsules from said supply means and for moving said capsules to a delivery point, each of said pockets in said transfer mechanism of said rectifying means having a peripheral portion disposed in the direction of movement of said transfer mechanism of said rectifying means; and
(2) a guide positioned dsadjacent said transfer mechanism of said rectifying means in the vicinity of said delivery point and having a slot aligned with said pockets in said transfer mechanism of said rectifying means and sized to permit said body portions of said capsules to hang through said slot and prevent said cap portions of said capsules from passing through said slot.

9. Apparatus according to claim 8 wherein said transfer mechanism of said rectifying means includes a rotating drum and said peripheral portions of said pockets are formed at the surface of said rotating drum and are disposed in the direction of rotation of said rotating drum.

10. Apparatus according to claim 3 wherein said rectifying means include:
(1) a transfer mechanism having a set of pockets for receiving said capsules from said supply means and for moving said capsules to a delivery point, each of said pockets in said transfer mechanism of said rectifying means having a peripheral portion disposed in the direction of movement of said transfer mechanism of said rectifying means; and
(2) a guide positioned adjacent said transfer mechanism of said rectifying means in the vicinity of said delivery point and having a slot aligned with said pockets in said transfer mechanism of said rectifying means and sized to permit said body portions of said capsules to hang through said slot and prevent said cap portions of said capsules from passing through said slot.

11. Apparatus according to claim 10 wherein said transfer mechanism of said rectifying means includes a rotating drum mounted for rotation on an axis parallel to the axis of rotation of said rotating drum of said transfer mechanism of said selected means.

12. Apparatus for orienting capsules having telescoping cap and body portions, said apparatus comprising:
means for supplying, in random orientation, capsules having telescoping cap and body portions;
a first capsule conveyor for receiving randomly oriented capsules from said supply means and for delivering said capsules to a delivery point, said first capsule conveyor having a first set of pockets formed with peripheral portions which extend in the direction of movement of said first capsule conveyor and are sized to loosely receive said capsules and permit rotation of said capsules about a horizontal axis from a position extending in said direction of movement of said first capsule conveyor to a position perpendicular to said direction of movement of said first capsule conveyor;
retaining means positioned adjacent said first capsule conveyor for retaining said capsules in said first set of pockets and for releasing said capsules from said first set of pockets at said delivery point, said retaining means having an orienting slot upstream from said delivery point and aligned with the path of movement of said peripheral portions of said first set of pockets, said orienting slot sized to permit said body portions of said capsules to hang through said slot and prevent said cap portions of said capsules from passing through said slot;
a second capsule conveyor for receiving said capsules at said delivery point and for delivering said capsules to a discharge point, said second capsule conveyor having a second set of pockets formed with recessed portions which extend perpendicular to the direction of movement of said second capsule conveyor and are sized larger than said body portions of said capsules and smaller than said cap portions of said capsules;
means for driving said capsules into said recessed portions of said second set of pockets, whereby capsules having their body portions in said recessed portions are loosely held and capsules having their cap portions in said recessed portions are tightly held;

means for discharging said loosely held capsules from said second set of pockets at said discharge point;

and means for ejecting said tightly held capsules from said second set of pockets at an ejectin point.

13. Apparatus according to claim 12 wherein said ejection means and ejection point are positioned downstream from said discharge point.

14. Apparatus according to claim 13 wherein said first capsule conveyor and said second capsule conveyor each include a rotating drum, said rotating drums mounted on parallel rotation axes located on opposite sides of said path of movement of said peripheral portions of said first set of pockets.

15. Apparatus according to claim 14 wherein said driving means include a vacuum chest which draws said capsules into said recessed portions of said second set of pockets.

16. Apparatus according to claim 15 wherein said ejection means include a knock-out member positioned in the path of movement of said recessed portions of said second set of pockets.

17. Apparatus according to claim 15 wherein said vacuum chest is positioned within said rotating drum of said second capsule conveyor and communicates with said recessed portions of said second set of pockets through holes extending from said recessed portions of said second set of pockets to said vacuum chest.

18. Apparatus for rectifying capsules having telescoping cap and body portions, said apparatus comprising:

means for supplying, in random orientation, capsules having telescoping cap and body portions;

a transfer mechanism having a set of pockets for receiving said capsules from said supply means and for moving said capsules to a delivery point, each of said pockets in said transfer mechanism having a peripheral portion disposed in the direction of movement of said transfer mechanism;

and a guide positioned adjacent said transfer mechanism and having a slot at an end thereof, said slot aligned with said pockets in said transfer mechanism and sized to permit said body portions of said capsules to hang through said slot and prevent said cap portions of said capsules from passing through said slot.

19. Apparatus according to claim 18 wherein said transfer mechanism includes a rotating drum and said peripheral portions of said pockets are formed at the surface of said rotating drum and are disposed in the direction of rotation of said rotating drum.

20. Apparatus according to claim 5 wherein said recessed portions of said pockets are connected by a groove extending through the bases thereof and said knock-out member is positioned in said groove and extends into said bases of said recessed portions of said pockets.

21. Apparatus according to claim 20 wherein said ejection means also include a vacuum source which draws said capsules from said recessed portions of said pockets.

22. Apparatus for segregating capsules having telescoping cap and body portions oriented in one direction from such capsules oriented in an opposite direction, said apparatus comprising:

means for supplying capsules having telescoping cap and body portions oriented in opposite directions;

a rotating drum having:
(1) a set of pockets for receiving said capsules and for moving said capsules to a discharge point, each of said pockets having a recessed portion disposed radially and sized larger than said body portions of said capsules and smaller than said cap portions of said capsules, and
(2) a groove in the inside surface of said drum and extending through the bases of said recessed portions of said pockets;

a vacuum chest communicating with said pockets in said rotating drum for drawing said capsules from said supply means into said pockets, whereby capsules having their body portions in said recessed portions of said pockets are loosely held and capsules having their cap portions in said recessed portions of said pockets are tightly held;

means for discharging said loosely held capsules from said pockets in said rotating drum at said discharge point;

and a knock-out member positioned in said groove in said rotating drum downstream from said discharge point for ejecting said tightly held capsules from said pockets in said rotating drum at an ejection point.

23. Apparatus according to claim 22 wherein said ejection means also include a vacuum source which draws said capsules from said recessed portions of said pockets.

* * * * *